(12) United States Patent
Asano et al.

(10) Patent No.: US 9,379,415 B2
(45) Date of Patent: Jun. 28, 2016

(54) ENTIRE SOLID LITHIUM SECONDARY BATTERY

(71) Applicant: Panasonic Intellectual Property Management Co., Ltd., Osaka (JP)

(72) Inventors: Tetsuya Asano, Kyoto (JP); Tomoyuki Komori, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 10 days.

(21) Appl. No.: 14/613,109

(22) Filed: Feb. 3, 2015

(65) Prior Publication Data

US 2015/0244023 A1 Aug. 27, 2015

(30) Foreign Application Priority Data

Feb. 21, 2014 (JP) ................... 2014-032203

(51) Int. Cl.
*H01M 10/0562* (2010.01)
*H01M 10/052* (2010.01)
*H01M 4/04* (2006.01)

(52) U.S. Cl.
CPC ........ *H01M 10/0562* (2013.01); *H01M 10/052* (2013.01); *H01M 4/0421* (2013.01); *H01M 2300/0071* (2013.01); *Y02E 60/122* (2013.01); *Y02T 10/7011* (2013.01)

(58) Field of Classification Search
CPC .......... H01M 10/0562; H01M 10/052; H01M 2300/0071; Y02E 60/122
See application file for complete search history.

(56) References Cited

FOREIGN PATENT DOCUMENTS

JP 2010-251257 11/2010

OTHER PUBLICATIONS

Li et al. "Atomic layer deposition of solid-state electrolyte coated cathode materials with superior high-voltage cycling behavior for lithium ion battery application"; Energy & Environmental Science (2014), 7(2), pp. 768-778.*
A. M. Glass et. al., "Ionic conductivity of quenched alkali niobate and tantalite glasses", Journal of Applied Physics, 49 (9), 1978, pp. 4808-4811.

* cited by examiner

*Primary Examiner* — Laura Weiner
(74) *Attorney, Agent, or Firm* — McDermott Will & Emery LLP

(57) ABSTRACT

The present invention provides an entire solid lithium secondary battery comprising: a cathode; an anode; and a solid electrolyte layer disposed between the cathode and the anode. The solid electrolyte layer is formed of a $Li_{(1-x)}TaO_3$ crystal (where $0.12 \leq x \leq 0.46$) having a trigonal ilmenite crystal structure. This entire solid lithium secondary battery has a good charge-discharge property.

5 Claims, 4 Drawing Sheets

ENTIRE SOLID LITHIUM SECONDARY BATTERY

BACKGROUND

1. Technical Field

The present invention relates to an entire solid lithium secondary battery.

2. Description of the Related Art

The entire solid lithium secondary battery is a lithium secondary battery including an electrolyte layer formed of a solid electrolyte. The entire solid lithium secondary battery has higher safety and higher energy capacity than a lithium secondary battery including a liquid electrolyte containing a flammable solvent. The entire solid lithium secondary battery comprises a cathode, an anode, and a solid electrolyte layer. The solid electrolyte layer is disposed between the cathode and the anode. A cathode active material layer included in the cathode is in contact with the solid electrolyte layer. The cathode active material layer contains a cathode active material capable of storing and releasing lithium ions. Similarly, an anode active material layer included in the anode is in contact with the solid electrolyte layer. The anode active material layer also contains an anode active material capable of storing and releasing lithium ions. The lithium ions travel through the solid electrolyte layer. In other words, in the entire solid lithium secondary battery, the lithium ions migrate between the cathode active material layer and the anode active material layer through the solid electrolyte layer in association with the redox reaction on the cathode and the anode. Due to this migration, the entire solid lithium secondary battery is charged and discharged.

Even when the solid electrolyte formed of an oxide is exposed to the air, the high stability and the high safety thereof are maintained. A. M. Glass et al., "Ionic conductivity of quenched alkali niobate and tantalite glasses", Journal of Applied Physics, 49(9), 1978, pp. 4808-4811 discloses that amorphous $LiNbO_3$ and amorphous $LiTaO_3$ have a substantially equal lithium ion conductivity. Japanese Patent Application laid-open Publication No. 2010-251257A discloses a crystalline solid electrolyte material formed of a complex containing $LiNbO_3$ and $LiNb_3O_8$ at a specific mixture ratio. Japanese Patent Application laid-open Publication No. 2010-251257A further discloses that amorphous $LiNbO_3$ has a higher lithium ion conductivity than crystalline $LiNbO_3$.

SUMMARY

The present invention provides an entire solid lithium secondary battery comprising:
  a cathode:
  an anode; and
  a solid electrolyte layer disposed between the cathode and the anode;
  wherein
  the solid electrolyte layer is formed of a $Li_{(1-x)}TaO_3$ crystal (where $0.12 \leq x \leq 0.46$) having a trigonal ilmenite crystal structure.

The present invention provides an entire solid lithium secondary battery comprising a solid electrolyte layer having a higher lithium ion conductivity than a conventional $LiTaO_3$ solid electrolyte. This entire solid lithium secondary battery has a good charge-discharge property.

DETAILED DESCRIPTION OF THE EMBODIMENT

Hereinafter, the present invention will be described with reference to the drawings.

Figure 1:
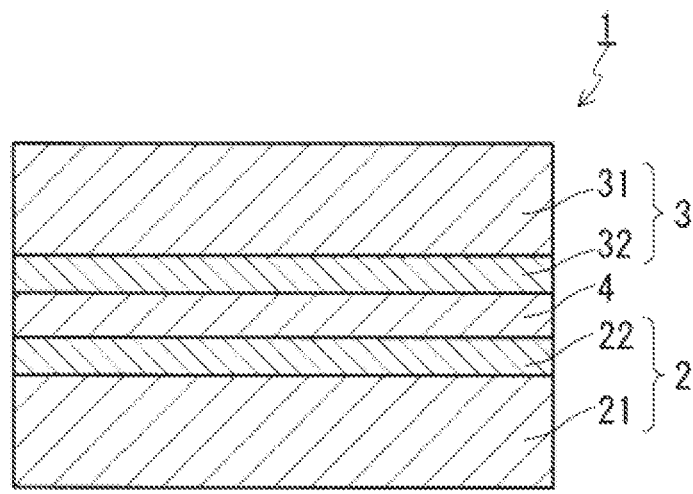
FIG. 1 shows a cross-sectional view of an entire solid lithium secondary battery according to an embodiment.

FIG. 1 shows a cross-sectional view of an entire solid lithium secondary battery 1 according to an embodiment. The entire solid lithium secondary battery 1 shown in FIG. 1 comprises a cathode 2, an anode 3, and a solid electrolyte layer 4. The solid electrolyte layer 4 is interposed between the cathode 2 and the anode 3. The cathode 2 comprises a cathode collecting electrode 21 and a cathode active material layer 22 formed thereon. The cathode active material layer 22 is electrically connected to the cathode collecting electrode 21 in series. In FIG. 1, the cathode active material layer 22 is in contact with the cathode collecting electrode 21. The anode 3 comprises an anode collecting electrode 31 and an anode active material layer 32 formed thereon. The anode active material layer 32 is electrically connected to the anode collecting electrode 31 in series. In FIG. 1, the anode active material layer 32 is in contact with the anode collecting electrode 31. The solid electrolyte layer 4 is disposed so that lithium ions can travel between the cathode active material layer 22 and the anode active material layer 32. In FIG. 1, the front surface of the solid electrolyte layer 4 is in contact with the cathode active material layer 22. The back surface of the solid electrolyte layer 4 is in contact with the anode active material layer 32.

(Cathode Collecting Electrode 21)

The cathode collecting electrode 21 is formed of an electron conductor which causes no chemical change with an ion conductor contained in the cathode active material layer 22 within a range of the predetermined operating voltage of the entire solid lithium secondary battery 1. An example of the range of the operating voltage of the cathode collecting electrode 21 is +3 volts to +4.2 volts with respect to a standard redox potential of lithium.

The cathode collecting electrode 21 has a shape of a layer when viewed in the cross-sectional view. An example of a material of the cathode collecting electrode 21 is stainless steel, aluminum, an aluminum alloy, platinum, gold, or titanium. From the viewpoints of the conductivity, the resistance property against the ion conductor, and the redox potential of the material, an example of the desirable material of the cathode collecting electrode 21 is aluminum, an aluminum alloy, platinum, or gold. Another example of the material of the cathode collecting electrode 21 is (i) conductive $SrTiO_3$ (hereinafter, referred to as "STO") which has been doped with La or Nb, or (ii) a metal containing Pt which has been epitaxially grown on a substrate such as a MgO substrate or a Si substrate. In a case where the cathode active material layer 22 which will be described later is epitaxially grown on the cathode collecting electrode 21, it is desirable that the cathode collecting electrode 21 is a substrate formed of STO or a substrate on which a Pt layer has been epitaxially grown.

(Cathode Active Material Layer 22)

The cathode active material layer 22 contains a cathode active material capable of storing and releasing lithium ions. An example of the cathode active material is $LiCo_{1-a-b}Ni_aAl_bO_2$ ($0 \leq a \leq 1$, $0 \leq b \leq 1$, and $a+b \leq 1$), $LiMn_2O_4$, or $LiFePO_4$. The cathode active material layer 22 may contain two or more kinds of the cathode active materials.

It is desirable that the cathode active material layer 22 is crystalline. In other words, it is desirable that the cathode active material layer 22 is formed of a crystal. The cathode active material layer 22 may be an oriented film grown on the cathode collecting electrode 21 or the solid electrolyte layer 4. More specifically, the cathode active material layer 22 may be a film which has been epitaxially grown on the cathode collecting electrode 21 or the solid electrolyte layer 4. Alternatively, the cathode active material layer 22 may be formed as below. First, the cathode active material layer 22 is epitaxially grown on a substrate. Then, the cathode active material layer 22 is removed from the substrate. Finally, the cathode active material layer 22 is disposed on the cathode collecting electrode 21 or the solid electrolyte layer 4.

The cathode active material layer 22 may contain a conductive assistant and/or a binder.

(Solid Electrolyte Layer 4)

The solid electrolyte layer 4 is formed of a $Li_{(1-x)}TaO_3$ crystal having a trigonal ilmenite crystal structure. The following mathematical formula (I) is satisfied.

$$0.12 \leq x \leq 0.46 \quad (I)$$

Lithium ions travel through the solid electrolyte layer 4.

The $Li_{(1-x)}TaO_3$ crystal having a value of x less than 0.12 has a low lithium ion conductivity and a poor charge-discharge property. See the comparative example 1 (x=0) which will be described later.

It is difficult to form the $Li_{(1-x)}TaO_3$ crystal having a value of x more than 0.46.

Each of a $LiTaO_3$ crystal and a $LiNbO_3$ crystal has a trigonal ilmenite crystal structure. Lithium ions do not travel through conventional crystalline $LiNbO_3$ at room temperature. Specifically, the ion conductivity of lithium ions in the conventional crystalline $LiNbO_3$ is less than $10^{-6}$ S/cm. As just described, the conventional crystalline $LiNbO_3$ is unsuitable for use as an electrolyte of a lithium secondary battery. For a similar reason, the conventional crystalline $LiTaO_3$ is unsuitable for use as an electrolyte of a lithium secondary battery, either.

As disclosed in A. M. Glass et al., "Ionic conductivity of quenched alkali niobate and tantalite glasses", Journal of Applied Physics, 49(9), 1978, pp. 4808-4811, amorphous $LiNbO_3$ has a higher lithium ion conductivity than crystalline $LiNbO_3$. For this reason, amorphous $LiTaO_3$ is expected to have a higher lithium ion conductivity than crystalline $LiTaO_3$. However, the present inventors found that amorphous $LiTaO_3$ has a low lithium ion conductivity. See the comparative example 4 which will be described later.

Besides, a lithium secondary battery comprising a solid electrolyte layer formed of amorphous $LiTaO_3$ has a poor charge-discharge property and a poor output property. The present inventors believe that this is because the battery has high internal resistance. In particular, the present inventors believe that this is because an interface resistance formed between an amorphous $LiTaO_3$ electrolyte layer and a crystalline cathode active material layer is high. On the other hand, in the present invention, the solid electrolyte layer 4 is formed of a $Li_{(1-x)}TaO_3$ crystal having a trigonal ilmenite crystal structure. The solid electrolyte layer 4 having the $Li_{(1-x)}TaO_3$ crystal having the trigonal ilmenite crystal structure has a higher lithium ion conductivity than a conventional $LiTaO_3$ solid electrolyte containing amorphous $LiTaO_3$. Specifically, for example, the solid electrolyte layer 4 has a lithium ion conductivity of not less than $10^{-6}$ S/cm. Since the entire solid lithium secondary battery according to the present embodiment comprises the solid electrolyte layer 4 having the $Li_{(1-x)}TaO_3$ crystal having a trigonal ilmenite crystal structure, the entire solid lithium secondary battery according to the present embodiment has low internal resistance and a good charge-discharge property.

The crystal structure of $LiTaO_3$ is a trigonal ilmenite crystal structure. However, the trigonal ilmenite crystal structure of $LiTaO_3$ is not strictly identical to the crystal structure of an ilmenite mineral (for example, titanic iron represented by the chemical formula $FeTiO_3$). Specifically, in the crystal structure of ilmenite mineral $ABO_3$, an A layer, a B layer, and an O layer are stacked along the c-axis direction thereof in the order of the A layer—the A layer—the O layer—the B layer—the B layer—the O layer. On the other hand, in the trigonal ilmenite crystal structure of $LiTaO_3$, a Li layer, a Ta layer, and an O layer are stacked along the c-axis direction thereof in the order of the Li layer—the Ta layer—the O layer—the Li layer—the Ta layer—the O layer. The composition of the $Li_{(1-x)}TaO_3$ crystal having the trigonal ilmenite crystal structure can be confirmed, for example, by a composition analysis method such as an inductively-coupled plasma spectrometry. The crystal structure of the $Li_{(1-x)}TaO_3$ crystal having the trigonal ilmenite crystal structure can be confirmed by a wide-angle X-ray diffraction measurement (hereinafter, referred to as "WAXD"). Specifically, when a diffraction peak is observed near at least one diffraction angle 2θ selected from the group consisting of 23.7 degrees, 32.8 degrees, 34.8 degrees, 39.2 degrees, and 62.4 degrees in a WAXD profile, the crystal is a $Li_{(1-x)}TaO_3$ crystal having a trigonal ilmenite crystal structure.

The ratio of Li/Ta (atomic ratio) in the $Li_{(1-x)}TaO_3$ crystal is not less than 0.54 and not more than 0.88. In other words, the value of (1−x) is not less than 0.54 and not more than 0.88. Therefore, the value of x is not less than 0.12 and not more than 0.46. The composition of oxygen included in the $Li_{(1-x)}TaO_3$ crystal is slightly deviated from the stoichiometric composition of $LiTaO_3$, depending on the Li/Ta ratio. Specifically, the O/Ta ratio (atomic ratio) in the $Li_{(1-x)}TaO_3$ crystal is not less than 2.75 and not more than 2.95.

The solid electrolyte layer 4 is formed of the $Li_{(1-x)}TaO_3$ crystal having a trigonal ilmenite crystal structure. The solid electrolyte layer 4 may be a single-crystalline layer formed of a $Li_{(1-x)}TaO_3$ single crystal or a polycrystalline layer formed of a $Li_{(1-x)}TaO_3$ polycrystal. The solid electrolyte layer 4 may slightly contain a crystal structure other than that of the $Li_{(1-x)}TaO_3$ crystal. The crystal structure other than that of the $Li_{(1-x)}TaO_3$ crystal may be generated when a thick solid electrolyte layer 4 is formed. The acceptable amount of the crystal structure other than that of the $Li_{(1-x)}TaO_3$ crystal included in the solid electrolyte layer 4 is an amount such that the peak intensity derived from the crystal structure other than that of the $Li_{(1-x)}TaO_3$ crystal is not more than one-twentieth the peak intensity derived from the crystal structure of the $Li_{(1-x)}TaO_3$ crystal in the WAXD profile of the solid electrolyte layer 4.

The $Li_{(1-x)}TaO_3$ crystal which forms the solid electrolyte layer 4 may have a three-dimensionally random crystal orientation. However, desirably, the $Li_{(1-x)}TaO_3$ crystal is oriented along at least one direction, For example, the $Li_{(1-x)}TaO_3$ crystal is oriented along the normal direction of the solid electrolyte layer 4. In this case, the orientation direction of the $Li_{(1-x)}TaO_3$ crystal is the same as the direction (hereinafter, referred to as "charge-discharge direction") in which the lithium ions travel through the solid electrolyte layer 4 during the charge or discharge of the entire solid lithium secondary battery 1 comprising the solid electrolyte layer 4. This improves the conductivity of lithium ions included in the solid electrolyte layer 4 along the charge-discharge direction. As a result, improved are the output property and the charge-discharge property of the entire solid lithium secondary battery 1.

The $Li_{(1-x)}TaO_3$ crystal may be uniaxially or biaxially oriented. For example, a biaxially-oriented $Li_{(1-x)}TaO_3$ crystal is oriented along the normal direction of the solid electrolyte layer 4 (namely, the charge-discharge direction) and the in-plane direction of the solid electrolyte layer 4 (namely, the direction perpendicular to the charge-discharge direction).

It is desirable that the c-plane of the $Li_{(1-x)}TaO_3$ crystal, namely, the (001) plane, is oriented parallel to the charge-discharge direction. In this case, the solid electrolyte layer 4 has a higher lithium ion conductivity along the charge-discharge direction. Specifically, the solid electrolyte layer 4 can be formed of a $Li_{(1-x)}TaO_3$ crystal oriented along a [110] direction or a $Li_{(1-x)}TaO_3$ crystal oriented along a [100] direction. Alternatively, the solid electrolyte layer 4 may be formed of the $Li_{(1-x)}TaO_3$ crystal oriented along a [−421], [241], or [2−21] direction.

The $Li_{(1-x)}TaO_3$ crystal oriented uniaxially or biaxially can be confirmed by a wide-angle X-ray diffraction method or an electron beam diffraction method. For example, in the $Li_{(1-x)}TaO_3$ crystal oriented uniaxially or biaxially, only a diffraction peak of a specific plane direction or only integral multiple diffraction peaks thereof is/are observed in a θ−2θ method of the wide-angle X-ray diffraction method. Furthermore, in a case of the $Li_{(1-x)}TaO_3$ crystal oriented biaxially, a diffraction peak is observed in a φ-scan method of the X-ray diffraction method. The peak interval accords with a rotational symmetry of the plane direction observed in the θ−2θ method. On the other hand, in the $Li_{(1-x)}TaO_3$ crystal oriented uniaxially, no peak is observed in the φ-scan method. In the electron beam diffraction method, a transmission electron microscope (hereinafter, referred to as "TEM") may be used.

The thickness of the solid electrolyte layer 4 is not limited. However, if the solid electrolyte layer 4 is too thin, an electrical short may be formed, since a pinhole is generated in the solid electrolyte layer 4. On the other hand, if the solid electrolyte layer 4 is too thick, the output property of the entire solid lithium secondary battery 1 is deteriorated, since the resistance with respect to the migration of lithium ions is high. The solid electrolyte layer 4 desirably has a thickness of approximately not less than 100 nanometers and not more than 20 micrometers. The solid electrolyte layer 4 having a thickness falling within this range lowers the resistance value per unit area of the solid electrolyte layer 4 (namely, the resistance value with respect to the migration of lithium ions) to approximately 50 ohm $cm^2$ or less. More desirably, the solid electrolyte layer 4 has a thickness of approximately not less than 200 nanometers and not more than 2 micrometers.

The method for forming the solid electrolyte layer 4 is not limited. The solid electrolyte layer 4 may be formed by a known method for forming a thin film such as a pulse laser deposition method (hereinafter, referred to as "PLD method"), a vacuum deposition method, a sputtering method, a chemical vapor deposition method, or a sol-gel method. The solid electrolyte layer 4 may be epitaxially grown on the cathode active material layer 22 or the anode active material layer 32. The solid electrolyte layer 4 is formed of the $LiTaO_3$ crystal having a trigonal ilmenite crystal structure in which lithium atoms are deficient significantly. For this reason, employed is a method for causing lithium atoms to be deficient by heating the $LiTaO_3$ crystal layer fabricated by a sintering method.

(Anode Active Material Layer 32)

The anode active material layer 32 may contain the anode active material capable of storing and releasing lithium ions. The anode active material is capable of storing and releasing lithium ions at a lower potential than the cathode active material. An example of the anode active material is a lithium alloy, an alloy, an intermetallic compound, carbon, an organic compound, an inorganic compound, a metal complex, or an organic polymer compound. The anode active material layer 32 may contain two or more kinds of these substances. The anode active material layer 32 may contain a conductive assistant and/or a binder.

It is desirable that the anode active material layer 32 is crystalline. In other words, it is desirable that the anode active material layer 32 is formed of a crystal. The anode active material layer 32 may be an oriented film grown on the anode collecting electrode 31 or the solid electrolyte layer 4. More specifically, the anode active material layer 32 may be a film which has been epitaxially grown on the anode collecting electrode 31 or the solid electrolyte layer 4. Alternatively, the anode active material layer 32 may be formed as below. First, the anode active material layer 32 is epitaxially grown on a substrate. Then, the substrate is removed from the anode active material layer 32. Finally, the anode active material layer 32 is disposed on the anode collecting electrode 31 or the solid electrolyte layer 4.

(Anode Collecting Electrode 31)

The anode collecting electrode 31 is formed of an electron conductor which causes no chemical change with an ion conductor contained in the anode active material layer 32 within a range of the predetermined operating voltage of the entire solid lithium secondary battery 1. An example of the range of the operating voltage of the anode collecting electrode 31 is 0 volts to +1.6 volts with respect to a standard oxidation-reduction potential of lithium.

The anode collecting electrode 31 has a shape of a layer when viewed in the cross-sectional view. An example of a material of the anode collecting electrode 31 is stainless steel, nickel, copper, titanium, aluminum, an aluminum alloy, platinum, or gold. From the viewpoints of the conductivity, the resistance property against the ion conductor, and the oxidation-reduction potential of the material, an example of the desirable material of the anode collecting electrode 31 is aluminum, an aluminum alloy, platinum, or gold.

The anode active material layer 32 is disposed on the anode collecting electrode 31. In a case where the anode active material layer 32 is epitaxially grown on the anode collecting electrode 31, it is desirable that the anode collecting electrode 31 is a conductive STO substrate doped with La or Nb.

(Fabrication Method)

Hereinafter, a method for fabricating the entire solid lithium secondary battery according to the present embodiment will be described with reference to FIG. 2A to FIG. 2D.

Figure 2A:
FIG. 2A shows a cross-sectional view of one step included in a method for fabricating the entire solid lithium secondary battery according to the embodiment.

First, as shown in FIG. 2A, the cathode active material layer 22 is formed on the cathode collecting electrode 21 by a sputtering method, a vacuum deposition method, a CVD method, a PLO method, or a sol-gel method. In this way, the cathode 2 is formed.

Figure 2B:
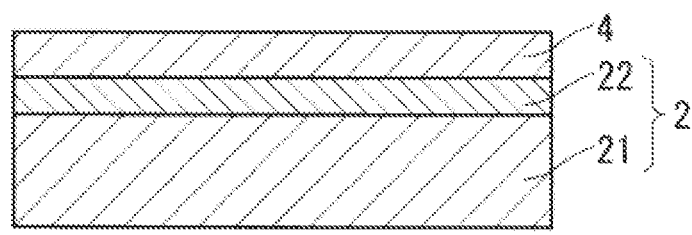
FIG. 2B shows a cross-sectional view of one step, subsequent to the step shown in FIG. 2A, included in the method for fabricating the entire solid lithium secondary battery according to the embodiment.

Then, as shown in FIG. 2B, the solid electrolyte layer 4 is formed on the cathode active material layer 22. As described above, it is desirable that the solid electrolyte layer 4 has a crystal structure oriented along a predetermined direction. The requirement for forming such a solid electrolyte layer 4, especially, the requirement for controlling the crystal orientation, is configured appropriately depending on a specific method for forming the solid electrolyte layer 4.

Figure 2C:
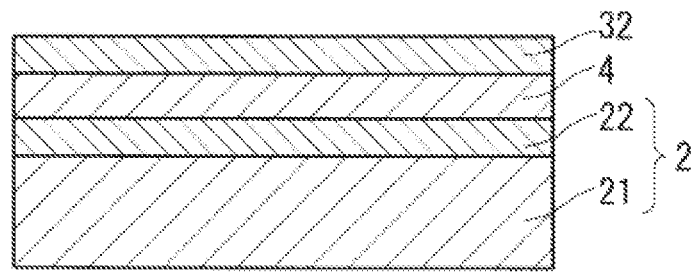
FIG. 2C shows a cross-sectional view of one step, subsequent to the step shown in FIG. 2B, included in the method for fabricating the entire solid lithium secondary battery according to the embodiment.

Next, as shown in FIG. 2C, the anode active material layer 32 is formed on the solid electrolyte layer 4 by a sputtering method, a vacuum deposition method, a CVD method, a PLD method, or a sol-gel method.

Figure 2D:
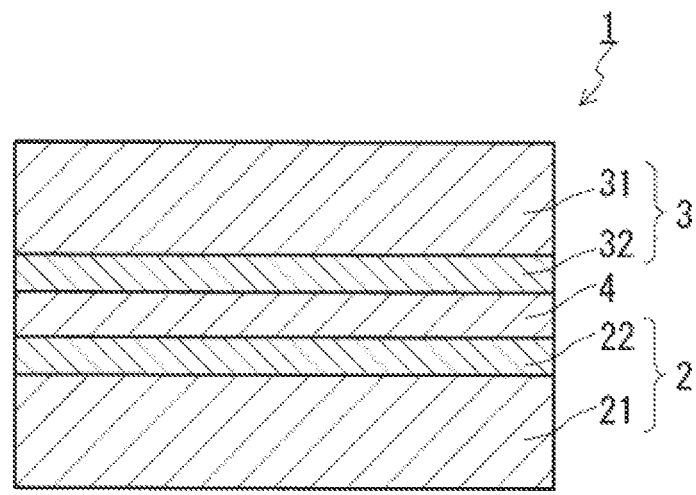
FIG. 2D shows a cross-sectional view of one step, subsequent to the step shown in FIG. 2C, included in the method for fabricating the entire solid lithium secondary battery according to the embodiment.

Finally, as shown in FIG. 2D, the anode collection electrode 31 is formed on the anode active material layer 32 by a sputtering method, a vacuum deposition method, a CVD method, a PLD method, or a sol-gel method to give the anode 3. Alternatively, a metal foil may be disposed as the anode collection electrode 31 on the anode active material layer 32. In this way, the entire solid lithium secondary battery 1 according to the present embodiment is provided.

The method for fabricating the entire solid lithium secondary battery 1 is not limited to the embodiment shown in FIG. 2A-FIG. 2D. For example, the entire solid lithium secondary battery 1 may be obtained by forming the anode active material layer 32, the solid electrolyte layer 4, the cathode active material layer 22, and the cathode collecting electrode 21 in this order.

EXAMPLES

Hereinafter, the present invention will be described in more detail with reference to the examples.

Inventive Example 1

[Fabrication of the Battery]

An entire solid lithium secondary battery 1 was fabricated in accordance with the method shown in FIG. 2A-FIG. 2D. Specifically, the entire solid lithium secondary battery 1 was fabricated as below.

A STO single-crystal substrate doped with La was prepared as the cathode collecting electrode 21. The STO substrate had a principal surface having a size of 10 millimeters× 10 millimeters. The STO substrate had a thickness of 500 micrometers. The STO substrate had a principal surface of a (110) plane.

Then, as shown in FIG. 2A, the cathode active material layer 22 formed of lithium cobalt oxide represented by the chemical formula $LiCoO_2$ was formed on the principal surface of the cathode collecting electrode 21 by a PLD method. The cathode active material layer 22 had a thickness of 250 nanometers. The condition of the PLD method for forming the cathode active material layer 22 is described below.

Target: Sintered oxide containing Li and Co (Li:Co=1.3:1 (atomic ratio))
Energy of laser pulse: 50 mJ
Pulse frequency: 2.5 Hz
Partial pressure of oxygen: 3 Pa
Temperature of substrate: 500 degrees Celsius
Interval between the target and the substrate: 55 millimeters Next, as shown in FIG. 2B, the solid electrolyte layer 4 was formed on the surface of the cathode active material layer 22 by a PLD method. The solid electrolyte layer 4 had a thickness of 200 nanometers. The condition of the PLD method for forming the solid electrolyte layer 4 is described below.

Target: Sintered oxide containing Li and Ta (Li:Ta=1.3:1 (atomic ratio))
Energy of laser pulse: 100 mJ
Pulse frequency: 5 Hz
Partial pressure of oxygen: 10 Pa
Temperature of substrate: 500 degrees Celsius
Interval between the target and the substrate: 40 millimeters

[Characterization of Crystal Structure and Crystal Orientation]

Figure 3:
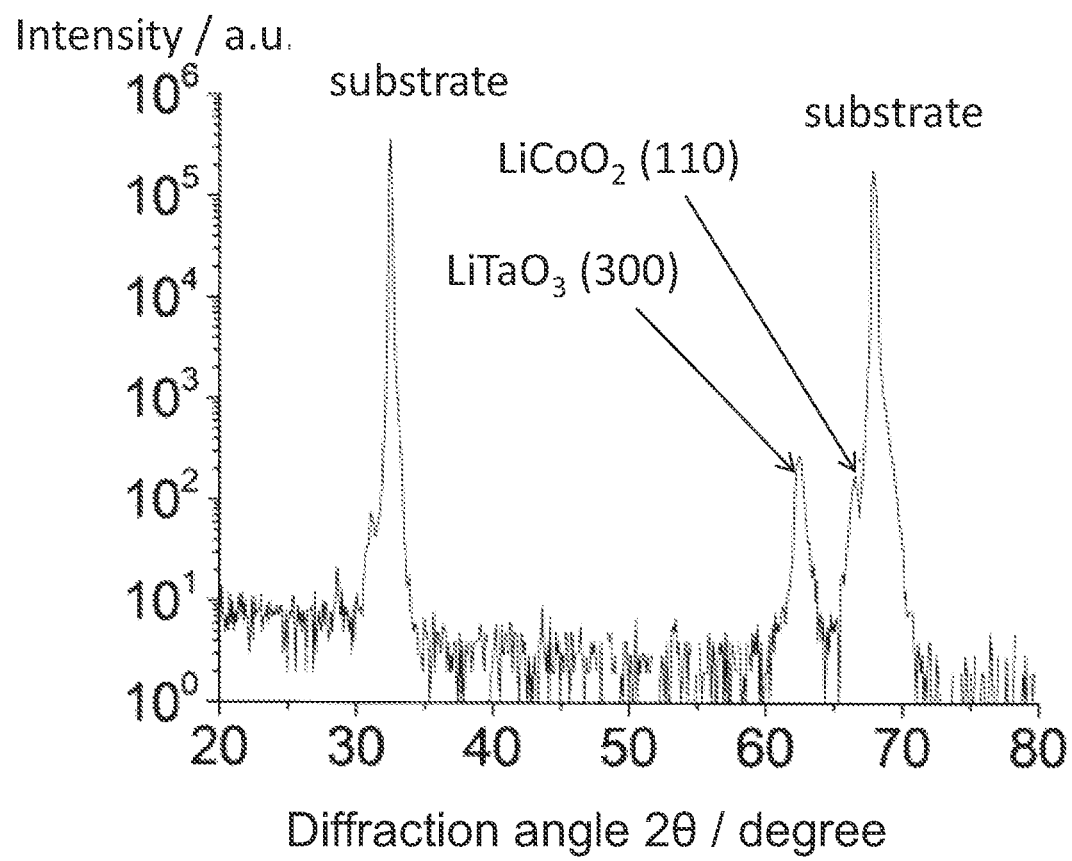
FIG. 3 shows a wide-angle X-ray diffraction profile of the solid electrolyte layer according to the inventive example 1.

After the formation of the solid electrolyte layer 4, the crystal structures of the cathode active material layer 22 and the solid electrolyte layer 4 were analyzed by a wide-angle X-ray diffraction method using an X-ray diffraction device (available from Philips Co., Ltd., Trade name: X'Pert MRD). FIG. 3 shows a diffraction profile. As shown in FIG. 3, a diffraction peak derived from a (110) plane of the $LiCoO_2$ crystal was observed. This diffraction peak corresponded to the cathode active material layer 22. Also observed was a diffraction peak derived from a (300) plane of the $LiTaO_3$ crystal having a trigonal ilmenite crystal structure. This diffraction peak corresponded to the solid electrolyte layer 4. Diffraction peaks other than these two diffraction peaks had a significantly small intensity. For example, a peak derived from a (006) plane had an intensity less than one-twentieth that of the peak derived from the (300) plane. In order to observe the crystal orientation in the in-plane direction of the solid electrolyte layer 4, the φ-scan of a (012) plane was conducted. As a result, a two-fold symmetry was observed. No diffraction peak of monoclinic $LiTa_3O_8$ was observed.

Next, as shown in FIG. 2C, the anode active material layer 32 formed of lithium was formed on the surface of the solid electrolyte layer 4 by a sputtering method. The anode active material layer 32 had a thickness of 200 nanometers.

Finally, as shown in FIG. 2D, the anode collecting electrode 31 formed of platinum was formed on the surface of the anode active material layer 32 by a sputtering method. The anode collecting electrode 31 had a thickness of 100 nanometers. In this way, as shown in FIG. 1, the entire solid lithium secondary battery according to the inventive example 1 was provided.

[Measurement of the Capacitance Ratio]

The capacitance ratio of the entire solid lithium secondary battery 1 according to the inventive example 1 was measured as below. First, a potentiostat was connected to the cathode collecting electrode 21 and the anode collecting electrode 31 under an argon atmosphere. Next, the entire solid lithium secondary battery 1 according to the inventive example 1 was charged to 4.2 volts using a constant electric current of 60 microamperes output from the potentiostat. Then, the entire solid lithium secondary battery 1 according to the inventive example 1 was discharged to 3.0 volts at 60 microamperes. The discharged capacitance at 60 microamperes was defined as "1 C".

The potentiostat was connected again, and the entire solid lithium secondary battery 1 according to the inventive example 1 was charged to 4.2 volts using the constant electric current of 60 microamperes. Next, the entire solid lithium secondary battery 1 according to the inventive example 1 was discharged to 3.0 volts at 120 microamperes. The discharged capacitance at 120 microamperes was defined as "2 C". The capacitance ratio is represented by 2 C/1 C. The entire solid lithium secondary battery 1 according to the inventive example 1 had a capacitance ratio of (2 C/1 C) of 0.61. The capacitance ratio (2 C/1 C) means the amount of change of the capacitance of the battery when the charge-discharge rate is changed. With an increase in the capacitance ratio (2 C/1 C), the battery has a lower internal resistance, a better charge-discharge property, and a better output property.

[Measurement of the Conductivity of Lithium Ions]

A sample for evaluation was prepared as below. First, a non-doped insulative STO substrate was prepared. The insulative STO substrate has a principal surface of a (110) plane and a size of 10 millimeters×10 millimeters×500 micrometers. Next, as shown in FIG. 2B, the solid electrolyte layer 4 was formed on the insulative STO substrate in a way similar to the case of the fabrication of the entire solid lithium secondary battery 1. In this way, the sample for evaluation was fabricated. The sample for evaluation did not have the cathode active material layer 22 and the anode 3.

Next, using an inductively-coupled plasma optical emission spectrometer (available from Hitachi High-Tech Science Corporation, Trade name: SPS1700VR, hereinafter, referred to as "ICP analysis device"), the composition of the solid electrolyte layer 4 included in the sample for evaluation was identified. As a result, the Li:Ta ratio was equal to 0.88:1 (atomic ratio) in the solid electrolyte layer 4. In other words, the value of x was equal to 0.12.

Two silver electrodes were formed on the surface of the solid electrolyte layer 4 included in the sample for evaluation. One electrode served as the cathode. The other electrode served as the anode. Then, the cathode and the anode of a potentiostat (available from Princeton Applied Research, Trade name: VersaSTAT4) were connected to these silver electrodes. An AC impedance with respect to the solid electrolyte layer 4 was measured. The measurement range was 1 Hz to 1 MHz. In this way, the resistance value with respect to travel of the lithium ions along the in-plane direction of the solid electrolyte layer 4 was measured. The measured resistance value was converted into the lithium ion conductivity. The lithium ion conductivity (in-plane direction) of the solid electrolyte layer 4 according to the inventive example 1 was $2.1 \times 10^{-6}$ S/cm.

Inventive Example 2

An entire solid lithium secondary battery 1 was fabricated similarly to the case of the inventive example 1, except that the condition of the PLD method for forming the solid electrolyte layer 4 was as below.

Target: Sintered oxide containing Li and Ta (Li:Ta=1.3:1 (atomic ratio))
Energy of laser pulse: 100 mJ
Pulse frequency: 2 Hz
Partial pressure of oxygen: 10 Pa
Temperature of substrate: 700 degrees Celsius
Interval between the target and the substrate: 40 millimeters The entire solid lithium secondary battery 1 according to the inventive example 2 had a capacitance ratio (2 C/1 C) of 0.60. After the formation of the solid electrolyte layer 4, the crystalline structures of the cathode active material layer 22 and the solid electrolyte layer 4 were analyzed by a wide-angle X-ray diffraction method similarly to the case of the inventive example 1. As a result, a diffraction peak derived from a (110) plane of the $LiCoO_2$ crystal was observed. This diffraction peak corresponded to the cathode active material layer 22. Also observed was a diffraction peak derived from a (110) plane of the $LiTaO_3$ crystal having a trigonal ilmenite crystal structure. This diffraction peak corresponded to the solid electrolyte layer 4. Diffraction peaks other than these two diffraction peaks had a significantly small intensity. For example, a peak derived from a (006) plane had a less than one-twentieth times smaller intensity than a peak derived from a (110) plane. In order to confirm the in-plane crystal orientation of the solid electrolyte layer 4 in the inventive example 2, the ϕ-scan of the (104) plane was conducted. As a result, a two-fold symmetry was confirmed. No diffraction peak of monoclinic $LiTa_3O_8$ was observed.

Similarly to the case of the inventive example 1, the composition and the in-plane lithium ion conductivity of the solid electrolyte layer 4 in the inventive example 2 were measured. As a result, the Li:Ta ratio was equal to 0.75:1 (atomic ratio) in the solid electrolyte layer 4 in the inventive example 2. In other words, the value of x was equal to 0.25. The lithium ion conductivity was $1.2 \times 10^{-5}$ S/cm.

Inventive Example 3

An entire solid lithium secondary battery 1 was fabricated similarly to the case of the inventive example 1, except that the condition of the PLD method for forming the solid electrolyte layer 4 was as below.

Target: Sintered oxide containing Li acid Ta (Li:Ta=1.3:1 (atomic ratio))
Energy of laser pulse: 100 mJ
Pulse frequency: 2 Hz
Partial pressure of oxygen: 10 Pa
Temperature of substrate: 600 degrees Celsius
Interval between the target and the substrate: 50 millimeters The entire solid lithium secondary battery 1 according to the inventive example 3 had a capacitance ratio (2 C/1 C) of 0.63. After the formation of the solid electrolyte layer 4, the crystalline structures of the cathode active material layer 22 and the solid electrolyte layer 4 were analyzed by a wide-angle X-ray diffraction method similarly to the case of the inventive example 1. As a result, a diffraction peak derived from a (110) plane of the $LiCoO_2$ crystal was observed. This diffraction peak corresponded to the cathode active material layer 22. Also observed was a diffraction peak derived from a (300) plane of the $LiTaO_3$ crystal having a trigonal ilmenite crystal structure. This diffraction peak corresponded to the solid electrolyte layer 4. Diffraction peaks other than these two diffraction peaks had a significantly small intensity. For example, a peak derived from a (006) plane had a less than one-twentieth times smaller intensity than a peak derived from a (300) plane. In order to confirm the in-plane crystal orientation of the solid electrolyte layer 4 in the inventive example 3, the ϕ-scan of the (012) plane was conducted. As a result, a two-fold symmetry was confirmed. No diffraction peak of monoclinic $LiTa_3O_8$ was observed.

Similarly to the case of the inventive example 1, the composition and the in-plane lithium ion conductivity of the solid electrolyte layer 4 in the inventive example 3 were measured. As a result, the Li:Ta ratio was equal to 0.54:1 (atomic ratio) in the solid electrolyte layer 4 in the inventive example 3. In other words, the value of x was equal to 0.46. The lithium ion conductivity was $4.5 \times 10^{-5}$ S/cm.

Inventive Example 4

An entire solid lithium secondary battery 1 was fabricated similarly to the case of the inventive example 1, except that the plane direction of the STO substrate was a (111) plane and that the condition of the PLD method for forming the solid electrolyte layer 4 was as below.

Target: Sintered oxide containing Li and Ta (Li:Ta=1.0:1 (atomic ratio))
  Energy of laser pulse: 100 mJ
  Pulse frequency: 2 Hz
  Partial pressure of oxygen: 10 Pa
  Temperature of substrate: 600 degrees Celsius
  Interval between the target and the substrate: 40 millimeters The entire solid lithium secondary battery 1 according to the inventive example 4 had a capacitance ratio (2 C/1 C) of 0.63. After the formation of the solid electrolyte layer 4, the crystalline structures of the cathode active material layer 22 and the solid electrolyte layer 4 were analyzed by a wide-angle X-ray diffraction method similarly to the case of the inventive example 1. As a result, a diffraction peak derived from a (003) plane of the $LiCoO_2$ crystal was observed. This diffraction peak corresponded to the cathode active material layer 22. Also observed was a diffraction peak derived from a (006) plane of the $LiTaO_3$ crystal having a trigonal ilmenite crystal structure. This diffraction peak corresponded to the solid electrolyte layer 4. Diffraction peaks other than these two diffraction peaks had a significantly small intensity. For example, a peak derived from a (300) plane had a less than one-twentieth times smaller intensity than a peak derived from a (006) plane. In order to confirm the in-plane crystal orientation of the solid electrolyte layer 4 in the inventive example 4, the φ-scan of the (104) plane was conducted. As a result, a six-fold symmetry was confirmed. No diffraction peak of monoclinic $LiTa_3O_8$ was observed.

Similarly to the case of the inventive example 1, the composition and the in-plane lithium ion conductivity of the solid electrolyte layer 4 in the inventive example 4 were measured. As a result, the Li:Ta ratio was equal to 0.62:1 (atomic ratio) in the solid electrolyte layer 4 in the inventive example 4. In other words, the value of x was equal to 0.38. The lithium ion conductivity was $57 \times 10^{-5}$ S/cm.

Inventive Example 5

An entire solid lithium secondary battery 1 was fabricated similarly to the case of the inventive example 4, except that the solid electrolyte layer 4 had a thickness of 2200 nanometers.

The entire solid lithium secondary battery 1 according to the inventive example 5 had a capacitance ratio (2 C/1 C) of 0.60. After the formation of the solid electrolyte layer 4, the crystalline structures of the cathode active material layer 22 and the solid electrolyte layer 4 were analyzed by a wide-angle X-ray diffraction method similarly to the case of the inventive example 1. As a result, a diffraction peak derived from a (003) plane of the $LiCoO_2$ crystal was observed. This diffraction peak corresponded to the cathode active material layer 22. Also observed was a diffraction peak derived from a (006) plane of the $LiTaO_3$ crystal having a trigonal ilmenite crystal structure. This diffraction peak corresponded to the solid electrolyte layer 4. Diffraction peaks other than these two diffraction peaks had a significantly small intensity. For example, a peak derived from a (300) plane had a less than one-twentieth times smaller intensity than a peak derived from a (006) plane. In order to confirm the in-plane crystal orientation of the solid electrolyte layer 4 in the inventive example 5, the φ-scan of the (104) plane was conducted. As a result, a six-fold symmetry was confirmed. No diffraction peak of monoclinic $LiTa_3O_8$ was observed.

Similarly to the case of the inventive example 1, the composition and the in-plane lithium ion conductivity of the solid electrolyte layer 4 in the inventive example 5 were measured. As a result, the Li:Ta ratio was equal to 0.62:1 (atomic ratio) in the solid electrolyte layer 4 in the inventive example 5. In other words, the value of x was equal to 0.38. The lithium ion conductivity was $3.2 \times 10^{-5}$ S/cm.

Comparative Example 1

An entire solid lithium secondary battery 1 was fabricated similarly to the case of the inventive example 1, except that the condition of the PLD method for forming the solid electrolyte layer 4 was as below.

Target: Sintered oxide containing Li and Ta (Li:Ta=1.5:1 (atomic ratio))
  Energy of laser pulse: 100 mJ
  Pulse frequency: 5 Hz
  Partial pressure of oxygen: 10 Pa
  Temperature of substrate: 450 degrees Celsius
  Interval between the target and the substrate: 40 millimeters The entire solid lithium secondary battery 1 according to the comparative example 1 had a capacitance ratio (2 C/1 C) of 0.42. After the formation of the solid electrolyte layer 4, the crystalline structures of the cathode active material layer 22 and the solid electrolyte layer 4 were analyzed by a wide-angle X-ray diffraction method similarly to the case of the inventive example 1. As a result, a diffraction peak derived from a (110) plane of the $LiCoO_2$ crystal was observed. This diffraction peak corresponded to the cathode active material layer 22. Also observed was a diffraction peak derived from a (300) plane of the $LiTaO_3$ crystal having a trigonal ilmenite crystal structure. This diffraction peak corresponded to the solid electrolyte layer 4. Diffraction peaks other than these two diffraction peaks had a significantly small intensity. For example, a peak derived from a (006) plane had a less than one-twentieth times smaller intensity than a peak derived from a (300) plane. In order to confirm the in-plane crystal orientation of the solid electrolyte layer 4 in the comparative example 1, the φ-scan of the (104) plane was conducted. As a result, a two-fold symmetry was confirmed. No diffraction peak of monoclinic $LiTa_3O_8$ was observed.

Similarly to the case of the inventive example 1, the composition and the in-plane lithium ion conductivity of the solid electrolyte layer 4 in the comparative example 1 were measured. As a result, the Li:Ta ratio was 1.00:1 (atomic ratio) in the solid electrolyte layer 4 in the comparative example 1. In other words, the value of x was equal to 0.00. The lithium ion conductivity was $2.0 \times 10^{-7}$ S/cm.

Comparative Example 2

An entire solid lithium secondary battery 1 was fabricated similarly to the case of the inventive example 1, except that the condition of the PLD method for forming the solid electrolyte layer 4 was as below.

Figure 4:
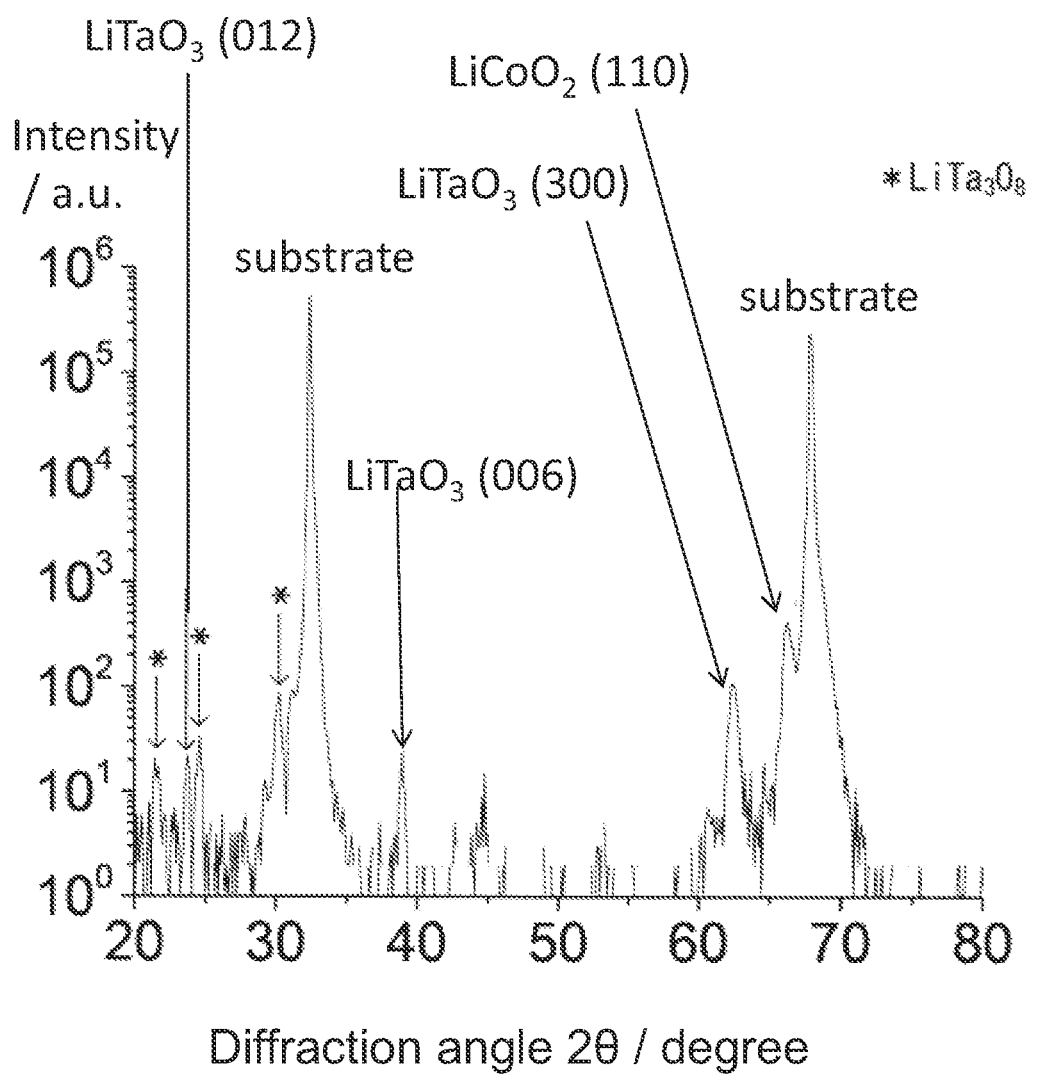
FIG. 4 shows a wide-angle X-ray diffraction profile of the solid electrolyte layer according to the comparative example 2.

Target: Sintered oxide containing Li and Ta (Li:Ta=1:1 (atomic ratio))
  Energy of laser pulse: 100 mJ
  Pulse frequency: 2 Hz
  Partial pressure of oxygen: 10 Pa
  Temperature of substrate: 250 degrees Celsius
  Interval between the target and the substrate: 40 millimeters The entire solid lithium secondary battery 1 according to the comparative example 2 had a capacitance ratio (2 C/1 C)

of 0.32. After the formation of the solid electrolyte layer 4, the crystal structures of the cathode active material layer 22 and the solid electrolyte layer 4 were analyzed similarly to the case of the inventive example 1. FIG. 4 shows a diffraction profile. As is clear from FIG. 4, a diffraction peak derived from a (110) plane of the LiCoO$_2$ crystal was observed. This corresponds to the cathode active material layer 22. Furthermore, observed was a diffraction peak derived from a (012) plane of the LiTaO$_3$ crystal having a trigonal ilmenite crystal structure. This corresponds to the solid electrolyte layer 4. Besides, various diffraction peaks were observed, including diffraction peaks which correspond to a (006) plane and a (300) plane of the LiTaO$_3$ crystal. In other words, the solid electrolyte layer 4 was polycrystalline. A diffraction peak of monoclinic LiTa$_3$O$_3$ was also observed.

Similarly to the case of the inventive example 1, the composition and the in-plane lithium ion conductivity of the solid electrolyte layer 4 in the comparative example 2 were measured. As a result, the Li:Ta ratio was equal to 0.85:1 (atomic ratio) in the solid electrolyte layer 4 in the comparative example 2. In other words, the value of x was equal to 0.15. The lithium ion conductivity was less than $1.0 \times 10^{-8}$ S/cm.

Comparative Example 3

An entire solid lithium secondary battery 1 was fabricated similarly to the case of the inventive example 1, except that the condition of the PLD method for forming the solid electrolyte layer 4 was as below.

Target: Sintered oxide containing Li and Ta (Li:Ta=1.3:1 (atomic ratio))
Energy of laser pulse: 100 mJ
Pulse frequency: 2 Hz
Partial pressure of oxygen: 10 Pa
Temperature of substrate: 250 degrees Celsius
Interval between the target and the substrate: 40 millimeters The entire solid lithium secondary battery 1 according to the comparative example 3 had a capacitance ratio (2 C/1 C) of 0.37. After the formation of the solid electrolyte layer 4, the crystal structures of the cathode active material layer 22 and the solid electrolyte layer 4 were analyzed similarly to the case of the inventive example 1. Similarly to the case of the comparative example 2, a diffraction peak derived from a (110) plane of the LiCoO$_2$ crystal was observed. This corresponds to the cathode active material layer 22. Furthermore, observed was a diffraction peak derived from a (012) plane of the LiTaO$_3$ crystal having a trigonal ilmenite crystal structure. This corresponds to the solid electrolyte layer 4. Besides, various diffraction peaks were observed, including diffraction peaks which correspond to a (006) plane and a (300) plane of the LiTaO$_3$ crystal. In other words, the solid electrolyte layer 4 was polycrystalline. A diffraction peak of monoclinic LiTa$_3$O$_3$ was also observed.

Similarly to the case of the inventive example 1, the composition and the in-plane lithium ion conductivity of the solid electrolyte layer 4 in the comparative example 3 were measured. As a result, the Li:Ta ratio was equal to 0.72:1 (atomic ratio) in the solid electrolyte layer 4 in the comparative example 3. In other words, the value of x was equal to 0.28. The lithium ion conductivity was $4.1 \times 10^{-8}$ S/cm.

Comparative Example 4

An entire solid lithium secondary battery 1 was fabricated similarly to the case of the inventive example 1, except that the solid electrolyte layer 4 was formed not by a PLD method but by a sputtering method. The condition of the sputtering method was as below.

Target: Sintered oxide containing Li and Ta(Li:Ta=1:1 (atomic ratio))
RF power: 80 W
Sputtering gas pressure: 1 Pa (Ar:O$_2$=80:20 (volume ratio))
Substrate temperature: room temperature The entire solid lithium secondary battery 1 according to the comparative example 4 had a capacitance ratio (2 C/1 C) of 0.38. After the formation of the solid electrolyte layer 4, the crystal structures of the cathode active material layer 22 and the solid electrolyte layer 4 were analyzed similarly to the case of the inventive example 1. As a result, a diffraction peak derived from a (110) plane of the LiCoO$_2$ crystal was observed. This corresponds to the cathode active material layer 22. However, no diffraction peak derived from the solid electrolyte layer 4 was observed. In other words, the solid electrolyte layer 4 was amorphous in the comparative example 4.

Similarly to the case of the inventive example 1, the composition and the in-plane lithium ion conductivity of the solid electrolyte layer 4 in the comparative example 4 were measured. As a result, the Li:Ta ratio was 0.85:1 (atomic ratio) in the solid electrolyte layer 4 in the comparative example 4. In other words, the value of x was equal to 0.15. The lithium ion conductivity was $6.0 \times 10^{-7}$ S/cm.

The following Table 1 and Table 2 show the results of the inventive examples 1-5 and the comparative examples 1-4.

TABLE 1

| | Crystal structure | Li/Ta ratio (Value of x) | Orientation of Li$_{(1-x)}$TaO$_3$ crystal |
|---|---|---|---|
| Inventive example 1 | trigonal ilmenite structure | 0.88 (x = 0.12) | (100) |
| Inventive example 2 | trigonal ilmenite structure | 0.75 (x = 0.25) | (110) |
| Inventive example 3 | trigonal ilmenite structure | 0.54 (x = 0.46) | (100) |
| Inventive example 4 | trigonal ilmenite structure | 0.62 (x = 0.38) | (001) |
| Inventive example 5 | trigonal ilmenite structure | 0.62 (x = 0.38) | (001) |
| Comparative example 1 | trigonal ilmenite structure | 1.00 (x = 0.00) | (100) |
| Comparative example 2 | mixed structure of trigonal ilmenite structure and monoclinic crystal | 0.85 (x = 0.15) | polycrystalline |
| Comparative example 3 | mixed structure of trigonal ilmenite structure and monoclinic crystal | 0.72 (x = 0.28) | polycrystalline |
| Comparative example 4 | amorphous | 0.85 (x = 0.15) | amorphous |

TABLE 2

| | Lithium ion conductivity (S/cm) | Capacitance ratio (2 C/1 C) |
|---|---|---|
| Inventive example 1 | $2.1 \times 10^{-6}$ | 0.61 |
| Inventive example 2 | $1.2 \times 10^{-5}$ | 0.60 |
| Inventive example 3 | $4.5 \times 10^{-5}$ | 0.63 |
| Inventive example 4 | $5.7 \times 10^{-5}$ | 0.63 |

TABLE 2-continued

| | Lithium ion conductivity (S/cm) | Capacitance ratio (2 C/1 C) |
|---|---|---|
| Inventive example 5 | $3.2 \times 10^{-5}$ | 0.60 |
| Comparative example 1 | $2.0 \times 10^{-7}$ | 0.42 |
| Comparative example 2 | Less than $1.0 \times 10^{-8}$ | 0.32 |
| Comparative example 3 | $4.1 \times 10^{-8}$ | 0.37 |
| Comparative example 4 | $6.0 \times 10^{-7}$ | 0.38 |

As shown in Table 1 and Table 2, each of the solid electrolyte layers 4 according to the inventive examples 1-5 has a higher lithium ion conductivity than the solid electrolyte layer 4 according to the comparative example 1 (Li/Ta ratio is 1). In other words, the entire solid lithium secondary battery 1 comprising the solid electrolyte layer 4 having a Li/Ta value of not less than 0.54 and not more than 0.88 (namely, x is not less than 0.12 and not more than 0.46) has a higher lithium on conductivity than the entire solid lithium secondary battery 1 comprising the solid electrolyte layer 4 having a Li/Ta value of 1 (namely, x is equal to 0).

Each of the entire solid lithium secondary batteries 1 according to the inventive examples 1-5 has a large capacitance ratio 2 C/1 C. Accordingly, each of the entire solid lithium secondary batteries 1 according to the inventive examples 1-5 has the low internal resistance, the good charge-discharge property, and the good output property. The solid electrolyte layer 4 in the inventive example 5 is more than ten times thicker than those in the inventive examples 1-4. However, the entire solid lithium secondary battery 1 according to the inventive example 5 has similar properties to those of the inventive examples 1-4.

The solid electrolyte layer 4 contained a $LiTa_3O_8$ phase in the comparative examples 2-3, although the Li/Ta ratio in the solid electrolyte layer 4 was not more than 0.88 (namely, x was not less than 0.12) and the solid electrolyte layer 4 was crystalline. For this reason, the lithium ion conductivity of the solid electrolyte layer 4 was very low in the comparative examples 2-3.

In the comparative example 4, the solid electrolyte layer 4 was amorphous. The solid electrolyte layer 4 in the comparative example 4 had a higher lithium ion conductivity than those of the comparative examples 1-3 in which the solid electrolyte layers 4 were crystalline. However, the lithium ion conductivity in the comparative example 4 was lower than those of the inventive examples 1-5. Although the solid electrolyte layer 4 in the comparative example 4 had a higher lithium ion conductivity than those of the comparative examples 1-3, the solid electrolyte layer 4 in the comparative example 4 had a capacitance ratio 2 C/1 C similar to those of the comparative examples 1-3. This means that the entire solid lithium secondary battery 1 according to the comparative example 4 has higher internal resistance than the entire solid lithium secondary batteries according to the comparative examples 1-3.

INDUSTRIAL APPLICABILITY

The entire solid lithium secondary battery according to the present invention can be used, for example, for a power source of a mobile device, an electric power tool, or transportation equipment. An example of the transportation equipment is an electric vehicle.

REFERENCE SIGNS LIST

1 Entire solid lithium secondary battery
2 Cathode
   21 Cathode collecting electrode
   22 Cathode active material layer
3 Anode
   31 Anode collecting electrode
   32 Anode active material layer
4 Solid electrolyte layer

The invention claimed is:
1. An entire solid lithium secondary battery comprising:
a cathode;
an anode; and
a solid electrolyte layer disposed between the cathode and the anode;
wherein
the solid electrolyte layer is formed of a $Li_{(1-x)}TaO_3$ crystal (where $0.12 \leq x \leq 0.46$) having a trigonal ilmenite crystal structure.
2. The entire solid lithium secondary battery according to claim 1, wherein
the solid electrolyte layer has a thickness of not less than 100 nanometers and not more than 20 micrometers.
3. The entire solid lithium secondary battery according to claim 1, wherein
the $Li_{(1-x)}TaO_3$ crystal is oriented along a normal direction of the solid electrolyte layer.
4. The entire solid lithium secondary battery according to claim 1, wherein
the $Li_{(1-x)}TaO_3$ crystal is biaxially oriented along a normal direction and an in-plane direction of the solid electrolyte layer.
5. The entire solid lithium secondary battery according to claim 1, wherein
the $Li_{(1-x)}TaO_3$ crystal is oriented along a [110] direction or along a [100] direction.

* * * * *